INVENTOR
S. J. BROLIN
BY R. B. Andis
ATTORNEY

United States Patent Office 3,461,244
Patented Aug. 12, 1969

3,461,244

DELTA MODULATION SYSTEM WITH CONTINUOUSLY VARIABLE COMPANDER

Stephen J. Brolin, Bronx, N.Y., assignor to Bell Telephone Laboratories, Incorporated, Murray Hill and Berkeley Heights, N.J., a corporation of New York Filed Aug. 16, 1966, Ser. No. 572,823
Int. Cl. H04l 1/00, 3/00; H04b 1/00
U.S. Cl. 179—15 5 Claims

ABSTRACT OF THE DISCLOSURE

A digital message transmission system which employs the type of differential pulse code modulation known as delta modulation, with a compander incorporated in the modulator-demodulator circuitry.

In a system employing the most common form of delta modulation, the message waveform to be transmitted is sampled at a predetermined rate, and positive and negative step signals are applied to integrating circuits at both transmitter and receiver at the sampling rate. In the delta modulator at the transmitter, the output of the integrator is compared with the instantaneous amplitude of the message waveform and the result of the comparison used to determine the polarity of the next step signal. The next step signal is positive, causing the integrator output to rise, if the integrator output is smaller than the message waveform and is negative, permitting the integrator output to fall, if the integrator output is larger than the message waveform. A binary digit of one kind is transmitted to the receiver each time the step signal is positive in the delta modulator, and one of the opposite kind is transmitted each time the step signal there is negative. In the delta demodulator at the receiver, the incoming binary digits control the polarity of the locally generated step signals and the original message waveform is reproduced by the integrator and a low-pass filter.

Important factors tending to detract from transmission quality in a delta modulation system include quantizing noise and overload distortion. Quantizing noise is caused by step signals which are not and cannot be infinitesimally small and can be particularly bothersome under idle circuit conditions and when the amplitude of the transmitted message waveform is small. Overload distortion occurs when the step signal is not large enough to permit the integrator output to follow rapid changes in the instantaneous amplitude of the message waveform and can be a major annoyance whenever it occurs. Although it would be possible to reduce quantizing noise by reducing the size of the step signal, overload distortion would then be increased. Similarly, although overload distortion could be reduced by increasing the size of the step signal, such a change would increase quantizing noise.

The dilemma can be resolved by the introduction of an appropriate form of companding into the delta modulation system. In this manner, the dynamic range of the message waveform is reduced by compression at the transmitter and restored by complementary expansion at the receiver. With its dynamic range reduced, the message waveform is less subject to either quantizing noise or overload distortion. In the past, companding has normally been accomplished with the aid of variolosser networks which include nonlinear devices such as semiconductor diodes. Devices of this type tend to be rather expensive, however, and need to be carefully selected and matched if the desired amount of compression is to be secured and if the expansion at the receiver is to complement the compression at the transmitter with the necessary degree of accuracy.

One object of the present invention is to minimize both quantizing noise and overload distortion in a delta modulation system in as simple and inexpensive a manner as possible.

Another and more particular object is to minimize both quantizing noise and overload distortion in a delta modulation system without requiring the use of expensive matched nonlinear variolosser devices.

The present invention provides syllabic companding in a delta modulation system and reduces both quantizing noise and overload distortion by changing the dynamic range of the delta modulator and delta demodulator themselves rather than the dynamic range of the message waveform. The circuitry required is particularly amenable to modern integrated circuit and thin-film techniques and no expensive variolosser diodes are required. In accordance with one feature of the invention, the size of the step signal in the delta modulator is adapted to both the volume level and the frequency content of the message waveform over at least part of its dynamic range. Compression is thereby achieved in the active delta modulator itself rather than in a passive variolosser network preceding it. In accordance with another feature of the invention, the delta demodulator is instructed to use the same varying step signal sizes by a digital signal which may be transmitted to the receiver at a small fraction of the delta modulator sampling rate.

In at least one important embodiment of the invention, the size of the step signal generated in the main or audio delta modulator at the transmitter is varied in a continuous manner from a predetermined minimum step size under the control of the message waveform. In this embodiment, the message waveform is supplied to a differentiator, rectifier, and low-pass filter at the transmitter and the output used to drive an auxiliary delta modulator. The output of the auxiliary or compression delta modulator is, in turn, transmitted in digital form to the receiver for controlling the size of the step signal in the main or audio delta demodulator. The binary companding digits may, in accordance with an additional feature of the invention, be combined in time division multiplex with the delta modulation digits carrying message waveform information for transmission over a common medium.

A more complete understanding of the invention and its various features may be obtained from a study of the following detailed description of one specific embodiment. In the drawings.

Figure 1:
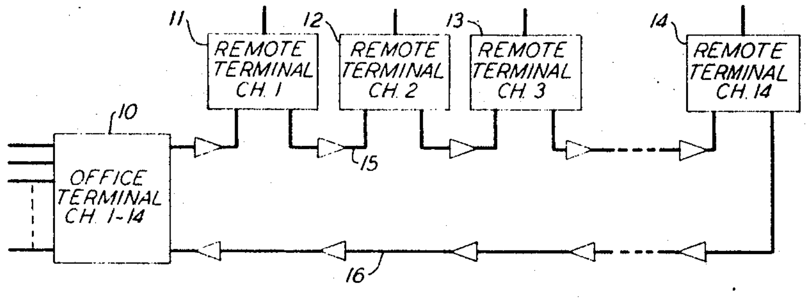
FIG. 1 is a block diagram of a complete multi-channel subscriber carrier system embodying the various features of the invention.

The subscriber carrier system illustrated in block diagram form in FIG. 1 includes an office terminal 10, a plurality of remote terminals of which terminals 11 through 14 are shown, an outward repeatered line 15, and an inward repeatered line 16. Office terminal 10 is located at a telephone central office and contains delta modulation transmitting and receiving terminal equipment for fourteen telephone message channels. With the aid of concentration, these fourteen channels can provide private line telephone service for as many as eighty subscribers. The fourteen message channels are combined in time division multiplex for transmission to their respective remote terminals. The remote terminals are, in turn, spaced at intervals along outward repeatered line 15 and each contains delta modulation transmitting and receiving terminal equipment for one or more telephone message channels. At each remote terminal, delta modulation receiving equipment intercepts the channel or channels with which it is associated and delta modulation transmitting equipment reinserts it on outward line 15. All fourteen message channels return to office terminal 10 in time division multiplex on inward line 16. Each remote terminal may serve a single message channel as shown or, alternatively and even more likely, different terminals may serve different numbers of channels. With concentration, each remote terminal always serves the same subscribers but is not always associated with the same time division channels. Rather, different channels may be associated with different terminals under different conditions of operation.

At office terminal 10 in FIG. 1 and at each remote terminal, suitable hybrid networks separate the two opposite directions of transmission in the respective message channels. For each channel, a delta modulator converts the incoming message waveform into binary digits for transmission out over the line and a delta demodulator converts received binary digits back into the original message waveform.

Figure 2:
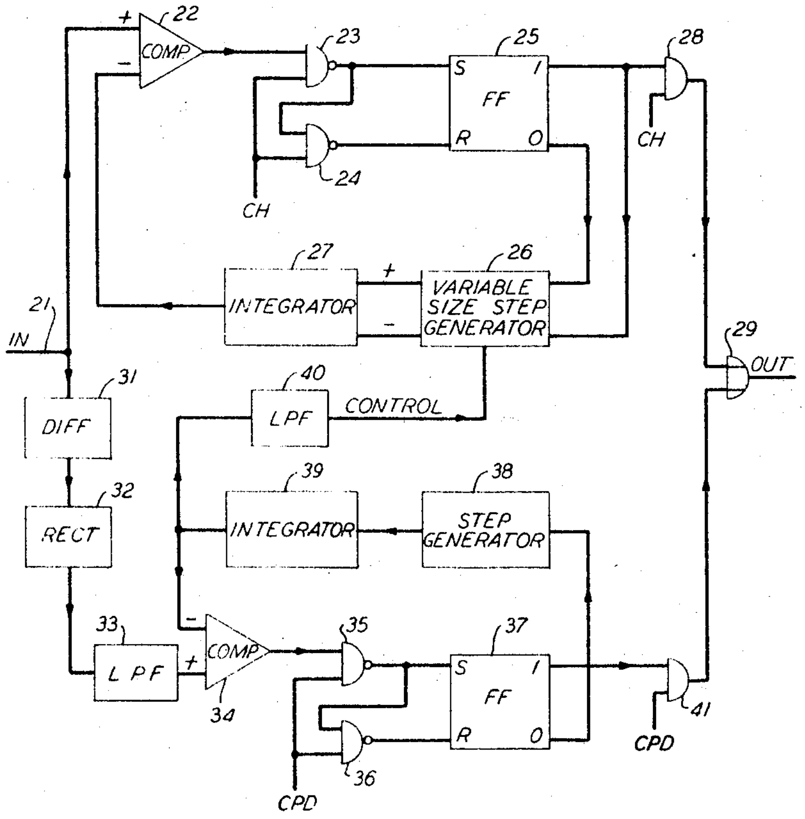
FIG. 2 is a block diagram of a delta modulator embodying features of the invention and suitable for use in the subscriber carrier system illustrated in FIG. 1.

The delta modulator illustrated in FIG. 2 serves both to encode the incoming message waveform and to provide continuous syllable compression in accordance with the present invention. As shown, an input line 21 is connected to one input of a comparator 22, which is a two-input circuit delivering an output having the polarity of the difference between its inputs. The output of comparator 22 is connected to a sample-and-hold circuit made up of a pair of inverting AND gates 23 and 24 and a bistable multivibrator or flip-flop 25. The inverting property of AND gates 23 and 24 is indicated symbolically by the small circles at their respective outputs.

As illustrated in FIG. 2, the output of comparator 22 is connected to one input of AND gate 23 and the output of AND gate 23 is connected to one input of AND gate 24. Channel pulses, which occur at the channel sampling rate of 96.5 kHz., are applied to the other inputs of AND gates 23 and 24. Finally, the output of AND gate 23 is connected to the set input S of flip-flop 25 while the output of AND gate 24 is connected to the reset input R.

When the output of comparator 22 in FIG. 2 is positive while a channel pulse is present, AND gate 23 applies binary "1" to the set set input of flip-flop 25 and AND gate 24 applies binary "0" to the reset input. Under such conditions, the output state of flip-flop 25 is as illustrated, with binary "1" appearing at the upper or set output and binary "0" appearing at the lower or reset output. When the output of comparator 22 is negative during a channel pulse, AND gate 23 applies binary "0" to the set input of flip-flop 25 and AND gate 24 applies binary "1" to the reset input. Under such conditions, the output state of flip-flop 25 is opposite to that illustrated, with binary "0" appearing at the upper or set output and binary "1" appearing at the lower or reset output. By way of example, in both states of flip-flop 25, binary "1" is represented by a positive voltage and binary "0" by zero voltage.

In accordance with a feature of the invention, the outputs of flip-flop 25 are connected to respective inputs of a variable size step signal generator 26, which generates a positive step signal when flip-flop 25 is in the state illustrated and a negative signal when flip-flop 25 is in the opposite state. The output of step signal generator 26 is connected to an integrating circuit 27 either by a common lead or by separate positive and negative leads as shown, and the output of integrator 27 is connected to the remaining input of comparator 22. Integrator 27 may include one or more stages of integration, as desired.

Output digits in FIG. 2 are taken from the upper or set output of flip-flop 25 and applied to one input of an AND gate 28, the other input of which is supplied with channel pulses at the 96.5 kHz. sampling rate delayed slightly from those applied to AND gates 22 and 23. The output from AND gate 28 is supplied to the outgoing line for transmission through an OR gate 29.

Except for variable step generator 26, the portion of the apparatus illustrated in FIG. 2 wihch has thus far been described is a conventional delta modulator. The sample-and-hold circuit samples the output of comparator 22 at a rate sufficiently high to permit the audio message waveform to be reproduced with acceptable accuracy. If the output of comparator 22 is positive, indicating that the instantaneous amplitude of the message waveform on input line 21 is larger than the output of integrator 27, a positive step signal is provided by generator 26 and binary "1" is transmitted through AND gate 28 and OR gate 29. If the output of comparator 22 is negative, indicating that the instantaneous amplitude of the message waveform on input line 21 is smaller than the output of integrator 27, the step signal produced by generator 26 is negative and binary "0" is transmitted through AND gate 28 and OR gate 29.

In accordance with a feature of the invention, the dynamic range of the delta modulator itself is compressed by adapting the size of the positive and negative step signals produced by generator 26 to both the volume level and the frequency content of the message waveform with an auxiliary or compression delta modulator. Since a delta modulator overloads on slope, a level sensor made up of a differentiator 31, a rectifier 32, and a low-pass filter 33 in tandem is connected from input line 21 to one input of a comparator 34. Comparator 34 is similar to comparator 22 and has its output connected to a sample-and-hold circuit made up of a pair of inverting AND gates 35 and 36 and a flip-flop 37.

As illustrated in FIG. 2, the output of comparator 34 is connected to one input of AND gate 35 and the output of AND gate 35 is connected to one input of AND gate 36. Companding control pulses, which occur at a rate of only 6 kHz., are applied to the other inputs of AND gates 35 and 36. The output of AND gate 35 is, in addition, connected to the set input S of flip-flop 37, while the output of AND gate 36 is connected to the reset input R. Except for the lower rate, operation is the same as that of the sample-and-hold circuit composed of AND gates 23 and 24 and flip-flop 25.

The lower or reset output of flip-flop 37 is connected to a step signal generator 38, the output of which is in turn connected to an integrator 39. The output of integrator 39 is connected both to the other input of comparator 34 and, through a low pass filter 40, to the control terminal of variable size step signal generator 26. To provide complementary control at the associated remote audio delta demodulator, the upper or set output of flip-flop 37 is connected to an input of an AND gate 41 and the output of AND gate 41 is connected to transmitting OR gate 29. The remaining input of AND gate 41 is supplied with companding control pulses at a 6 kHz. rate delayed slightly from those applied to AND gates 35 and 36.

The operation of the auxiliary or companding delta modulator shown in FIG. 2 is much the same as that of the main or audio delta modulator. The sample-and-hold gate samples the output of comparator 34. If the output of comparator 34 is positive, indicating that the detected volume level of the message waveform is larger than the output of integrator 39, a positive step signal is provided by generator 38 and binary "1" is transmitted through AND gate 41 and OR gate 29. If the output of comparator 34 is negative, indicating that the detected volume level is smaller than the output of integrator 39, a negative step signal is provided by generator 38 and binary "0" is transmitted through AND gate 41 and OR gate 29. At the same time, in accordance with the invention, the output of integrator 39 is applied to low-pass filter 40 to control the size of the step signal provided by generator 26. As the volume level of the message waveform increases the step size increases, and as the volume level of the message waveform decreases the step size decreases. The step size is, by way of example, adjusted in this manner over a 26 db range from a predetermined minimum.

Figure 3:
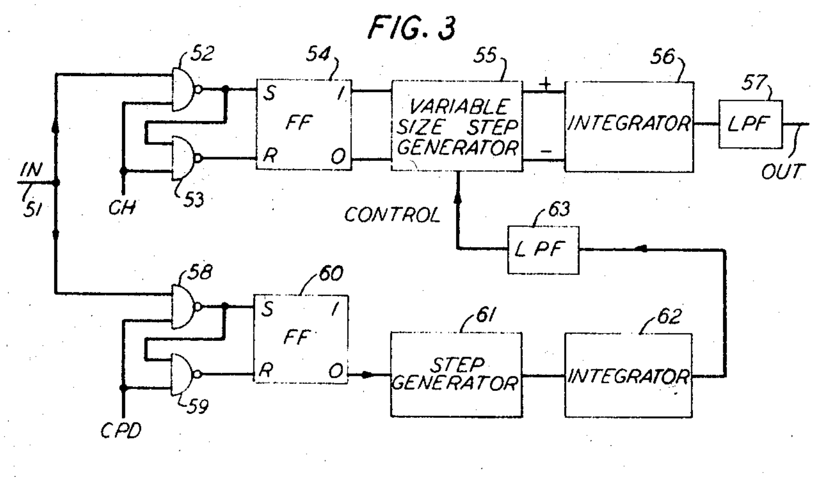
FIG. 3 is a block diagram of a delta demodulator embodying features of the invention and suitable for use in the subscriber carrier system shown in FIG. 1.

The delta demodulator illustrated in FIG. 3 serves not only to decode the received message digits and convert them to the original message waveform but also to provide continuous syllabic expansion which is complementary to the compression performed at the transmitting terminal in the associated delta modulator. As shown, an input line 51 is connected to a sample-and-hold circuit made up of a pair of inverting AND gates 52 and 53 and a flip-flop 54. Input line 51 is connected to one input of AND gate 52 and the output of AND gate 52 is connected to one input of AND gate 53. The remaining inputs of AND gates 52 and 53 are supplied with channel pulses at the 96.5 kHz. channel sampling rate. The output of AND gate 52 is also connected to the set input S of flip-flop 54, and the output of AND gate 53 is connected to the reset input R.

The set and reset outputs of flip-flop 54 in FIG. 3 are connected to respective inputs of variable size step signal generator 55, which is substantially identical to variable size step signal generator 26 in FIG. 2. Step signal generator 55 produces a positive step signal when flip-flop 54 is in the state illustrated and a negative step signal when flip-flop 54 is in the opposite state. The output of step signal generator 55 is connected to an integrator 56, the output of which is connected to a low-pass filter 57 to re-create the originally encoded message waveform. Integrator 56 is substantially identical to integrator 27 in FIG. 2 and, like it, may include one or more stages of integration as desired.

In operation, the incoming binary message digits received on input line 51 cause the sample-and-hold circuit, step generator 55, and integrator 56 in FIG. 3 to track the sample-and-hold circuit, step generator 26, and integrator 27 in FIG. 2. A received binary "1" causes binary "0" to appear at the output of AND gate 52 and binary "1" to appear at the output of AND gate 53. Flip-flop 54 is switched to the state illustrated and step signal generator 55 produces a positive step signal. A received binary "0" causes binary "1" to appear at the output of AND gate 52 and binary "0" to appear at the output of AND gate 53. Flip-flop 54 is switched to the state opposite that illustrated, and step signal generator 55 produces a negative step signal.

In accordance with a feature of the invention, the audio delta demodulator in FIG. 3 is provided with syllabic expansion complementary to the syllabic compression provided the audio delta modulator in FIG. 2 by an auxiliary or expansion delta demodulator. The received companding digits are selected by yet another sample-and-hold circuit made up of a pair of inverting AND gates 58 and 59 and a flip-flop 60. As illustrated in FIG. 3, input line 51 is connected to one input of AND gate 58, and the output of AND gate 58 is connected to one input of AND gate 59. The remaining inputs of AND gates 58 and 59 are supplied with companding control pulses at the 6 kHz. companding control rate.

The output of AND gate 58 is also connected to the set input S of flip-flop 60, and the output of AND gate 59 is connected to the reset input R.

The lower or reset output of flip-flop 60 in the auxiliary delta demodulator in FIG. 3 is connected to a step signal generator 61, which is substantially identical to step signal generator 38 in FIG. 2. The output of step signal generator 61 is connected through an integrator 62 and a low-pass filter 63 to the control terminal of variable size step signal generator 55 in the main or audio delta demodulator. In this manner, variable size step signal generator 55 is made to track variable size step signal generator 26 in FIG. 2. When the received companding digit is binary "1," binary "0" appears at the output of AND gate 58 and binary "1" appears at the output of AND gate 59. Flip-flop 60 is switched to the output state illustrated, with binary "0" appearing at the reset output and step signal generator 61 produces a positive step signal. When the received companding digit is binary "0," binary "1" appears at the output of AND gate 58 and binary "0" appears at the output of AND gate 59. Flip-flop 60 is switched to the state opposite that illustrated, with binary "1" appearing at the reset output and step signal generator 61 produces a negative step signal.

Figure 4:
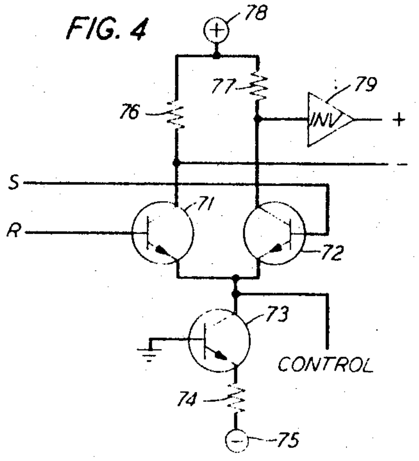
FIG. 4 is a schematic diagram of a variable step signal generator suitable for use in the delta modulator and delta demodulator shown in FIGS. 2 and 3.

A variable size step signal generator suitable for use as generators 26 and 55 in FIGS. 2 and 3 is illustrated in FIG. 4. As shown, the lower or reset output of the associated sample-and-hold flip-flop is connected to the base of a n-p-n transistor 71 and the upper or set output is connected to the base of a n-p-n transistor 72. Transistors 71 and 72 have their emitters connected together and to the collector of a n-p-n transistor 73. The base of transistor 73 is grounded and the emitter is returned through a resistor 74 to a negative D-C biasing source 75. The collectors of transistors 71 and 72 are connected through respective resistors 76 and 77 to a positive D-C biasing source 78. As illustrated, negative outputs are taken directly from the collector of transistor 71 and positive outputs are taken from the collector of transistor 72 through a unity gain inverting amplifier 79. The control lead for fixing the size of the generated step signals is connected to the emitters of transistors 71 and 72 and supplies current into a very high impedance.

The minimum step size is determined primarily by resistor 74, D-C source 75, and the resulting forward bias on the emitter-base junction of transistor 73. When binary "1" appears at the base of transistor 72 and binary "0" at that of transistor 71, the emitter-base junction of transistor 72 is forward biased and the emitter-collector path of that transistor conducts. Current flows from inverting amplifier 79 through the emitter-collector path of transistor 72, causing a similar current to flow out from amplifier 79 into the positive output lead and causing the output of the associated integrator to rise. When the state of the associated sample-and-hold flip-flop is reversed, causing binary "0" to appear at the base of transistor 72 and binary "1" to appear at the base of transistor 71, the emitter-base junction of transistor 71 is forward biased and the emitter-collector path of that transitor conducts. Current flows in from the negative output lead through the emitter-collector path of transistor 71, causing the output of the associated integrator to fall. The size of the step, and hence the rate of the rise or fall of the output of the associated integrator, is determined by the amount of current flowing away from the emitters of transistors 71 and 72 through the control lead plus the minimum bias current. The step size is minimum and the rate of the rise or fall is minimum for zero control current.

Figure 5:
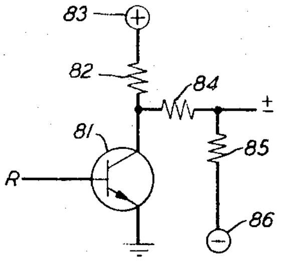
FIG. 5 is a schematic diagram of a fixed step signal generator suitable for use in the delta modulator and delta demodulator shown in FIGS. 2 and 3.

A fixed size step signal generator suitable for use as generators 38 and 61 in FIGS. 2 and 3 is illustrated in FIG. 5. The lower or reset output of the associated sample-and-hold flip-flop is connected to the base of a n-p-n transistor 81. The emitter of transistor 81 is grounded and the collector is connected through a resistor 82 to a positive D-C biasing source 83. A pair of resistors 84 and 85 are connected in series from the collector of transistor 81 to a negative D-C biasing source 86 and the step signal output is taken from the junction between resistors 84 and 85. When binary "0" appears at the base of transistor 81, the emitter-collector path of transistor 21 is nonconductive and, because the collector is positive, the voltage-dividing action of resistors 82, 84, and 85 yields a positive output. When binary "1" appears at the base of transistor 81, the emitter-collector path of transistor 81 conducts. The collector of transistor 81 then drops to ground potential and the voltage-dividing action of resistors 84 and 85 yields a negative output.

Figure 6:
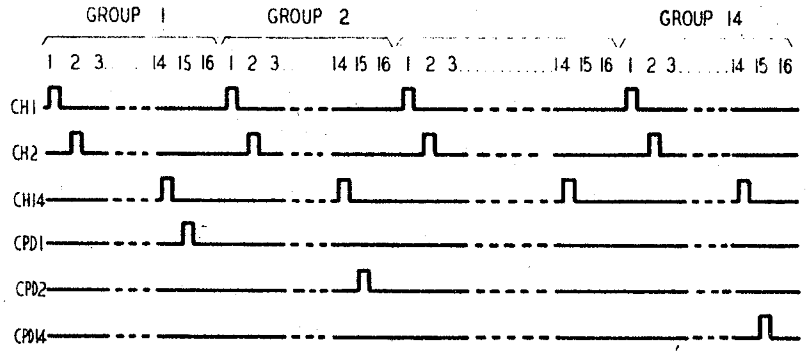
FIG. 6 illustrates the relative timing of message waveform and companding digits in the subscriber carrier system illustrated in FIG. 1.

FIG. 6 is a timing diagram illustrating the sequence of channel and companding control pulses used in the embodiment of the invention illustrated in FIG. 1 and applied specifically to the delta modulators and delta demodulators shown in FIGS. 2 and 3. In each group of sixteen consecutive digit spaces, a channel pulse is provided for channel one during the first digit space, a channel pulse is provided for channel two during the second digit space, and so on through the fourteenth digit space. The fifteenth digit space is used for companding, in accordance with the invention, and during successive digit groups companding control pulses are provided for each channel in sequence. The sixteenth digit space is used for purposes not relevant to the present invention. As the fourteen message channels and their respective companding digits are combined in time division multiplex for transmission, therefore, each group of sixteen successive digits includes one digit from each of the fourteen channels and a companding digit for one channel only. The companding digit for the next channel is found in the next group of digits. For a basic pulse repetition rate of 1.544 mHz. and a channel digit rate of 96.5 kHz., the present invention thus permits the application of continuous syllabic companding to all channels by transmitting companding digits at the rate of only 6 kHz.

It is to be understood that the above-described arrangements are illustrative of the application of the principles of the invention. Numerous other arrangements may be devices by those skilled in the art without departing from the spirit and scope of the invention.

What is claimed is:

1. A delta modulation system with continuous syllabic companding for transmission of a message waveform from a transmitting terminal to a receiving terminal which includes, at said transmitting terminal, a delta modulator comprising a first comparator having a single output and a pair of inputs, means to sample the output of said first comparator on a periodic repetitive basis, a primary output transmitter and a first step signal generator both connected to respond to the sampled output of said first comparator, said primary output transmitter producing a binary digit of one kind for transmission to said receiving terminal whenever the sample is positive and a binary digit of another kind for transmission to said receiving terminal whenever the sample is negative and said first step signal generator producing a step signal of one polarity whenever the sample is positive and a step signal of the opposite polarity whenever the sample is negative, a first integrator connected to receive the step signal produced by said first step signal generator, means to supply said message waveform and the output from said first integrator to the respective inputs of said first comparator, and means to vary the magnitude of the step signal produced by said first step signal generator continuously under the control of both the frequency content and the volume level of said message waveform over at least part of its dynamic range and, at said receiving terminal, a delta demodulator comprising a second step signal generator connected to respond to binary digits received from said primary output transmitter, said second step signal generator producing a step signal of one polarity whenever the received binary digit is of one kind and a step signal of the opposite polarity whenever the received binary digit is of the other kind, a second integrator connected to receive the step signal produced by said second step signal generator, a low-pass filter connected to the output of said second integrator generator to re-create the message waveform encoded at said transmitting terminal, and means to vary the magnitude of the step signal produced by said second step signal generator in synchronism with the variation of the step signal produced by said first step signal generator at said transmitting terminal.

2. A delta modulation system in accordance with claim 1 in which the magnitude of the step signal produced by said first step signal generator at said transmitting terminal is varied by a differentiator having an input and an output, a second comparator having a single output and a pair of inputs, means to sample the output of said second comparator on a periodic repetitive basis, a third step signal generator connected to respond to the sampled output of said second comparator, said third step signal generator producing a step signal of one polarity whenever the sample is positive and a step signal of the opposite polarity whenever the sample is negative, a third integrator connected to receive the step signal produced by said third step signal generator, means to supply said message waveform to the input of said differentiator, a rectifier and a low-pass filter connected in tandem between the output of said differentiator and one of the inputs of said second comparator, means to supply the output from said third integrator to the other input of said second comparator, and means to vary the magnitude of the step signal produced by said first step signal generator under the control of the output from said third integrator.

3. A delta modulation system in accordance with claim 2 in which the output of said first comparator is sampled at a rate of at least several times greater than the rate at which the output from said second comparator is sampled.

4. A delta modulation system in accordance with claim 2 in which said delta modulator includes a secondary output transmitter connected to respond to the sampled output of said second comparator, said secondary output transmitter producing a binary digit of one kind for transmission to said receiving terminal whenever the sample is positive and a binary digit of another kind for transmission to said receiving terminal whenever the sample is negative, and in which the magnitude of the step signal produced at said receiving terminal by said second step signal generator is varied under the control of the binary digits received from said secondary output transmitter.

5. A delta modulation system in accordance with claim 4 in which the binary digits produced at said transmitting terminal by said primary and secondary output transmitters are combined in time division multiplex for transmission to said receiving terminal over a common medium.

References Cited

UNITED STATES PATENTS

| | | | |
|---|---|---|---|
| 2,724,740 | 11/1955 | Cutler. | |
| 3,393,364 | 7/1968 | Fine | 325—38.1 |

FOREIGN PATENTS

| | | |
|---|---|---|
| 684,318 | 12/1952 | Great Britain. |

RALPH D. BLAKESLEE, Primary Examiner

U.S. Cl. X.R.

325—38